Oct. 13, 1953 J. J. SMITH 2,655,339
PIPE LINE STOPPER
Filed July 11, 1951 3 Sheets-Sheet 1
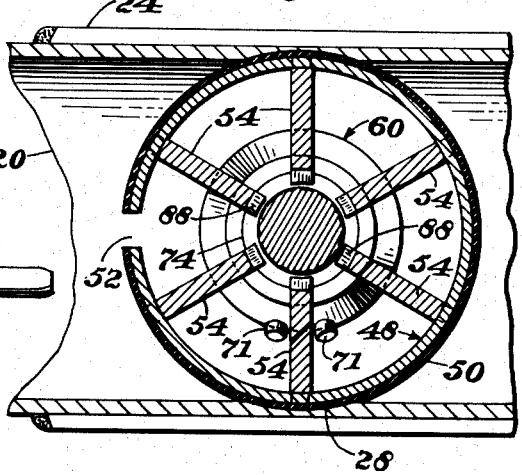
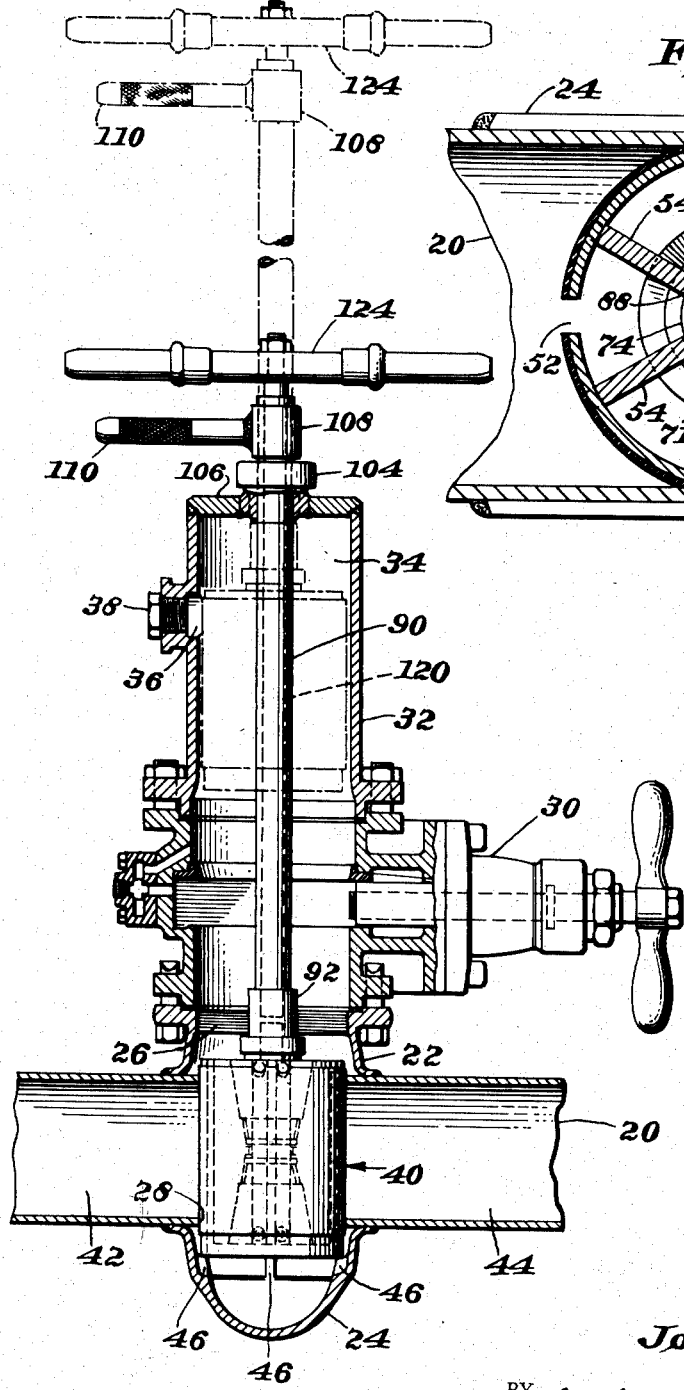
INVENTOR:
John J. Smith,
BY Cushman, Darby & Cushman
ATTORNEYS.

Oct. 13, 1953   J. J. SMITH   2,655,339
PIPE LINE STOPPER
Filed July 11, 1951   3 Sheets-Sheet 2

INVENTOR:
John J. Smith,
BY Cushman, Darby & Cushman
ATTORNEYS.

Oct. 13, 1953      J. J. SMITH      2,655,339
PIPE LINE STOPPER
Filed July 11, 1951      3 Sheets-Sheet 3
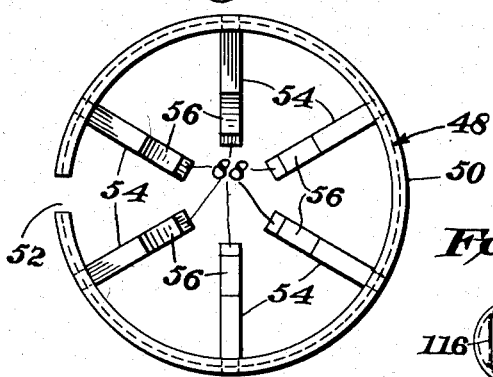
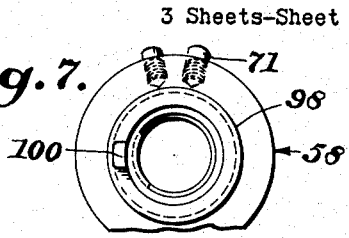
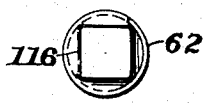
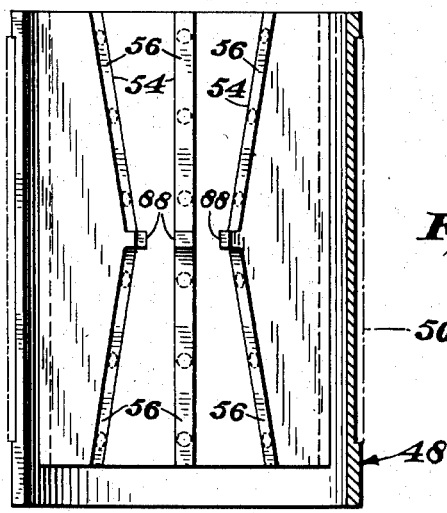
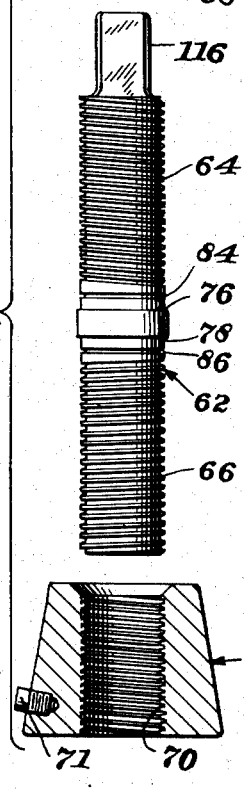
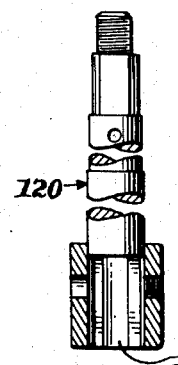
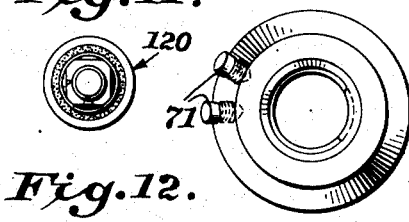
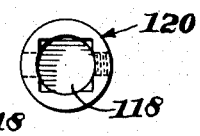
INVENTOR:
John J. Smith,
BY Cushman, Darby & Cushman
ATTORNEYS Patented Oct. 13, 1953

2,655,339

UNITED STATES PATENT OFFICE 2,655,339

PIPE LINE STOPPER

John J. Smith, Decatur, Ill., assignor to Mueller Co., Decatur, Ill., a corporation of Illinois Application July 11, 1951, Serial No. 236,108

8 Claims. (Cl. 251—68)

This invention relates to a pipe line stopper of the expanding plug type which is adapted to be inserted in a transverse circular cut-out portion of a pipe and expanded to stop the flow of fluid therethrough. More particularly, this invention relates to improvements in a pipe stopper of the expanding sleeve type which is shown and described more in detail in a copending application of Edgar A. Koenig, Serial No. 638,865, filed January 3, 1946, now abandoned.

The stopper disclosed in the aforementioned copending application comprises a longitudinally split, flexible cylindrical sleeve having a plurality of evenly spaced radial vanes or webs secured to the interior of the sleeve. The end portions of these vanes are tapered and a pair of frusto-conical wedging elements cooperate with the tapered ends of the vanes for a mutual wedging action that is effective to expand the sleeve into sealing relationship with the edges of the cut-out portion of the pipe. Opposite axial movement of the conical wedging elements is accomplished by mounting them on a jack screw having two sets of threads of opposite pitch. The specific construction disclosed in the aforementioned Koenig application, while extremely satisfactory in practical usage, is, under certain conditions, incapable of relieving the wedging action on the sleeve in its expanded position, thereby rendering removal of the stopper from its operative position within the pipe extremely difficult.

It is, therefore, an object of this invention to provide an improved pipe stopper of the expansible sleeve type in which the wedging mechanism for expanding the sleeve is operative under all conditions both to expand and to permit contraction of the sleeve.

It is another object of this invention to provide a pipe stopper of the type described with effective means for limiting the extent of relative axial movement between the jackscrew and the expansible sleeve.

It is still another object of this invention to provide a pipe stopper of the type described with simple means for readily orienting the stopper sleeve within a pipe, with the slot in the sleeve positioned on the upstream side of the pipe to thereby utilize the fluid pressure to assist in expansion of the sleeve.

It is a further object of this invention to provide an improved pipe line stopper of the type described which is relatively simple in construction and therefore inexpensive to manufacture and operate.

Other objects and advantages of the invention will be evident from the following description and the accompanying drawings, in which:

Figure 1 is an elevational sectional view showing a pipe line stopper embodying this invention operatively associated with a line and in stopping position therein.

Figure 3 is a transverse sectional view taken on line 3—3 of Figure 1.

Figure 4 is a longitudinal sectional view of the stopper sleeve.

Figure 5 is an end view of the stopper sleeve.

Figure 6 is a longitudinal exploded view, partly in section, of the jackscrew and wedging elements carried thereby.

Figure 7 is an outer end view of the upper wedging element shown in Figure 6.

Figure 8 is an upper end view of the jackscrew shown in Figure 6.

Figure 9 is an inner end view of the lower wedging element shown in Figure 6.

Figure 10 is a longitudinal view of the operating extension of the jackscrew.

Figure 11 is an upper end view of the jackscrew extension shown in Figure 10.

Figure 12 is a lower end view of the jackscrew extension shown in Figure 10.

Figure 2:
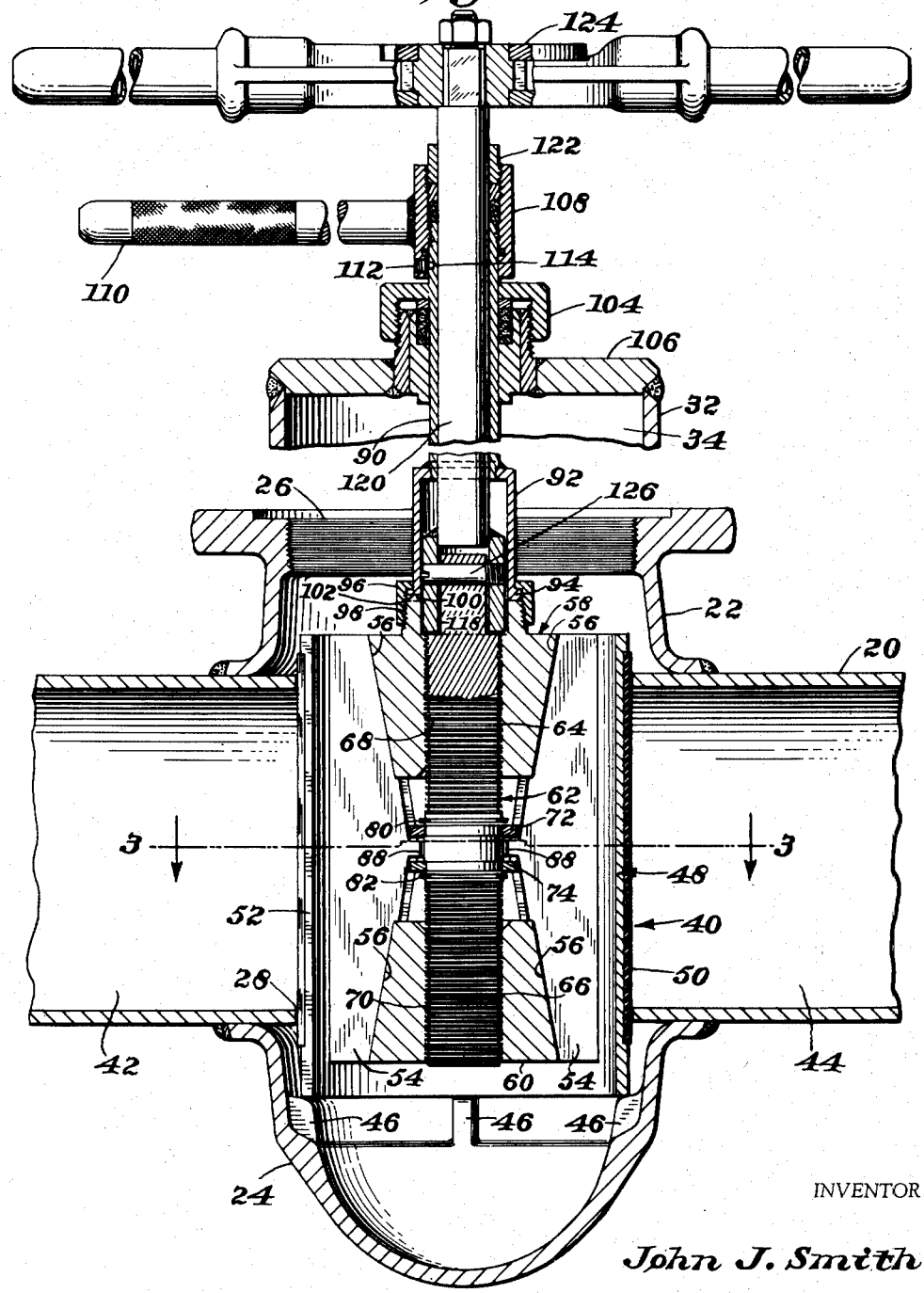
Figure 2 is an enlarged detail fragmentary view corresponding to Figure 1.

Referring now to the drawings, there is shown in Figure 1 a section of a pipe line 20 having conventional upper and lower fittings 22 and 24 for tapping the line, welded or otherwise suitably secured thereto. The upper fitting 22 is provided with a flanged opening 26 disposed in alignment with a transverse circular bore or cut-out 28 previously cut through the pipe, such bore 28 being of a diameter at least slightly greater than the inside diameter of the pipe 20. Connected to the upper fitting 22 is a control valve 30, usually of the gate type as shown, and secured to the gate valve 30 is a conventional stopper barrel or bell 32 defining an interior pressure chamber 34 and having a radial outlet port 36 in one side thereof which may be closed by a plug 38. The purpose of this outlet port 36 will be described later. An expansible sleeve pipe stopper 40 embodying this invention is shown in expanded position within the cut-out portion 28 of the pipe line 20 to stop the flow of fluid from pipe section 42 to pipe section 44. A plurality of lugs 46 are arranged within the lower fitting 24 for engagement by the stopper 40 to properly position the latter axially within the transverse cut-out portion 28 of the pipe.

The stopper 40 comprises a cylindrical sleeve 48, preferably of rather springy material such as sheet steel or the like, having a flexible covering 50, of rubber or other suitable sealing material to provide an effective seal against the edges of the cut-out portion 28 of the pipe, as best shown in Figure 2. The sleeve 48 has a longitudinal slot 52 (see Figures 3 and 5) and is constructed so that, when relaxed, the sleeve is of slightly smaller exterior diameter than that of the cut-out portion or transverse opening 28 through the pipe. Secured to the interior of the sleeve 48, as by welding, are a plurality of evenly circumferentially spaced, inwardly extending radial webs or vanes 54. The end portions of these vanes 54 are equally tapered in oppositely extending directions outwardly of the interior of the sleeve 48. Engaged with the tapered surfaces 56 of the vanes are a pair of frusto-conical wedging elements, 58 and 60, which by opopsite axial movement toward one another are effective to produce a mutual wedging action with the vanes 54 that will expand the sleeve 48 tightly against the inner edges of the transverse opening 28 through the pipe. It will be evident that opposite axial movement of the wedging elements 58 and 60 away from each other will be effective to relieve their wedging action and permit the sleeve 48 to spring back to its relaxed position so that the stopper 40 may be withdrawn into the bell 32 or inserted into the opening 28 through the pipe.

Opposite axial movement of the wedging elements 58 and 60 is accomplished by means of a jackscrew 62 positioned axially within the sleeve and having two sets of threads of opposite pitch 64 and 66 which are engaged with complementary threads 68 and 70 on the corresponding wedging elements. In order to maintain the wedging elements 58 and 60 against rotation, while the jackscrew 62 is being rotated, each element is provided with a pair of radially projecting pins 71 which straddle one of the vanes 54. In operation, one of the wedging elements is held fixed against rotation, and thereby maintains the sleeve 48 and the other wedging element fixed against rotation by means of the pins 71, during rotation of the jackscrew 62.

Due to the fact that the transverse circular opening 28 through the pipe is not always of uniform diameter throughout its axial length, because of wobbling of the cutting tool (not shown) or for other reasons, it is desirable to permit relative axial movement in the same direction between the wedging elements 58 and 60 and the vanes 54 in order to effect unequal expansion of the sleeve 48. For example, if the upper portion of the transverse opening 28 through the pipe shown in Figure 1 is of slightly greater diameter than the lower portion of such opening, downward movement of the jackscrew 62, and both wedging elements, relative to the vanes, will serve, upon subsequent wedging rotation of the jackscrew, to expand the sleeve slightly more at the top than at the bottom portion thereof to compensate for such non-uniformity of diameter. At the same time, however, it is not desirable to permit excessive relative axial movement beteewn the jackscrew 62 and the vanes 54. If such were permitted, it can easily be seen that when the stopper 40 is in expanded position in the pipe 20, should the lower wedging element 60 become jammed or struck against the vanes 54, rotation of the jackscrew 62 to relieve the wedging effect merely would move the latter downwardly through the sleeve 48 without producing opposite axial movement of the wedging elements. Such downward movement might continue until the jackscrew 62 was rendered inoperative by contact with the bottom of the lower fitting 24 without relieving the expensive forces on the sleeve.

The means for limiting relative axial movement between the jackscrew 62 and the sleeve 48, while at the same time permitting some relative movement therebetween in order to effect the above discussed unequal expansion of the sleeve, comprises a pair of spaced washers or collars 72 and 74 (see Figure 2) mounted on the jackscrew 62 between the wedging elements 58 and 60 and seated, respectively, against opposite shoulders 76 and 78 (see Figure 6), on the screw. These collars 72 and 74 may be detachably secured in place by means of split rings 80 and 82 (Figure 2) disposed in annular grooves 84 and 86 and bearing against the outer sides of the collars. Each vane 54 is provided with a projection 88 which extends into the annular space between the collars 72 and 74. The projections 88, however, are of slightly less width than the aforementioned annular space, so that limited relative axial movement is permitted between the jackscrew 62 and the sleeve 48. Essentially, the projections 88 and the collars 72 and 74 have the same effect as a loosely interfitting annular rib and groove construction. It will be evident, however, that in a situation similar to that described above wherein the lower wedging element 60 becomes jammed against its corresponding wedging surfaces 56 on the vanes 54, rotation of the jackscrew 62 in a direction to produce opposite axial movement of the wedging elements 58 and 60 away from each other, will effect downward movement of the jackscrew relative to the sleeve 48 only until the collar 72 engages the vane projections 88. At this point, downward movement of the jackscrew 62 is stopped and its continued rotation in the same direction can result only in opposite axial movement of the wedging elements away from each other.

The stopper 40 may be rotated to properly orient the slot 52 within the transverse opening 28 through the pipe 20 by means of an orienting tube 90 which has an enlarged lower portion 92 and a radial flange 94 on the lower end thereof engaged by a coupling ring 96 that is threaded onto an annular collar 98 projecting from the outer end of the wedging element 58. An interfitting tongue 100 and slot 102 are provided on the outer end of the collar 98 and in the lower end of the tube 90, respectively, to prevent relative rotation therebetween. Preferably, this tongue and slot connection is disposed in radial alignment with the slot 52 in the side of the sleeve 48. The tube 90 extends upwardly through a stuffing box 104 in the top or closed end 106 of the stopper bell 32 and has a sleeve 108, provided with a radial handle 110, threaded onto its outer end. A set screw 112 on the sleeve projects into a radial indentation 114 in the side of the tube 90 in order to position the handle 110 in radial alignment with the slot 102 in the lower end of the tube, to thereby provide a convenient indication of the orientation of the sleeve slot 52 when the stopper 40 is inserted into the pipe 20.

The upper end of the jackscrew 62 is squared, as at 116, and receives a complementary socket 118 of an operating rod 120 which extends upwardly through the orienting tube 90 and projects out of a stuffing box 122 on the sleeve 108. A handled ratchet device 124 is secured on the outer end of the rod 120 for rotating the same. The jackscrew 62 and the operating rod 120 are secured together by means of a pin 126 which extends diametrically through the socket portion 118 of the rod and the squared portion 116 of the jackscrew.

In operation of the stopper after the circular opening 28 has been cut through the pipe 20, the gate valve 30 closed, and the boring machine (not shown) detached from the valve 30 and replaced by the stopper 40 and its bell 32, the valve 30 is opened and the stopper 40 pushed downwardly by means of the ratchet device handles until the bottom edge of the sleeve 48 contacts the positioning lugs 46 in the lower fitting 24. The tube handle 110 is then rotated to point in the direction of the upstream side of the line 20 in order to position the slot 52 on the upstream side of the line. The handle 110 is then held in this position while the ratchet device 124 is operated to rotate the jackscrew 62 in a direction to produce opposite axial movement of the wedging elements 58 and 60 toward one another to thereby effect expansion of the sleeve 48 against the edges of the transverse opening 28 through the pipe.

As previously stated, upstream line pressure will aid in expanding the sleeve 48 against the edges of the opening through the pipe and also serves to securely hold the sleeve against the downstream edges of the opening through the pipe to thereby provide a tight seal and prevent any leakage of fluid to the downstream section of the pipe. At the same time, the floating connection between the jackscrew 62 and the vanes 54 permits the jackscrew to shift axially to some extent in order to compensate for any inequalities in diameter between the top and bottom portions of the transverse opening 28 through the pipe. Because of the fact that the sleeve slot 52 faces the upstream side of the line, it will be evident that line pressure will exist within the pressure chamber 34. Hence, by connecting a by-pass (not shown) to the radial port 36 in the bell 32, the line pressure may be diverted to any desired location, that is, line fluid will flow through the slot 52, through the sleeve 48 and bell 32, and out through the radial port 36.

When it is desired to remove the stopper from the pipe 20, the ratchet device 124 is operated in a reverse direction to turn the jackscrew 62 in a direction to effect opposite axial movement of the wedging elements 58 and 60 away from each other in order to relieve the expanding forces on the sleeve 48. Should either wedging element stick to the vanes 54, so that rotation of the jackscrew results only in axial movement thereof without relieving the wedging forces, such axial movement will occur only until one or the other of the collars 72 and 74 engages the vane projections 88. Thereafter, continued rotation of the jackscrew 62 will positively move the wedging elements 72 and 74 away from each other. Upon relief of the expansion forces, the stopper sleeve 48 will contract somewhat because of its inherent springiness, thus permitting leakage of line pressure to the downstream side of the line 20. Such leakage serves to equalize the pressure on opposite sides of the downstream side of the stopper sleeve 48, so that the stopper 40 may easily be withdrawn from the pipe to reestablish flow therethrough.

It will thus be seen that the objects of the invention have been completely achieved. It will be realized, however, that various modifications of the specific embodiment used to illustrate this invention may be made by one skilled in the art. Therefore, this invention includes all modifications which are encompassed by the spirit and scope of the following claims.

I claim:

1. In a pipe stopper comprising a longitudinally-split cylindrical sleeve having means defining two oppositely-inclined sets of conically-arranged radial interior surfaces, spaced conical wedges within said sleeve complementary to and engaging said surfaces for expanding said sleeve by opposite axial movement, means preventing relative rotation between said sleeve and said wedges, and an axially disposed jackscrew threadedly carrying said wedges for movement in opposite directions upon rotation of the screw, the combination of means for limiting relative axial movement between said sleeve and said screw comprising radially interfitting means on said sleeve and said screw.

2. The structure defined in claim 1 in which the interfitting means have limited lost motion axial engagement to permit slight relative axial movement between the sleeve and the screw.

3. The structure defined in claim 1 in which the wedges are disposed with their apices in opposition and the interfitting means is located between said wedges.

4. In a pipe stopper comprising a longitudinally-split cylindrical sleeve having means defining two oppositely-inclined sets of conically-arranged radial interior surfaces, spaced conical wedges within said sleeve complementary to and engaging said surfaces for expanding said sleeve by opposite axial movement, means preventing relative rotation between said sleeve and said wedges, and an axially disposed jackscrew threadedly carrying said wedges for movement in opposite directions upon rotation of the screw, the combination of an operating tube detachably connected to the outer end of one of said wedges and adapted to extend in sealing relation through the closed end of a stopper bell, and a radially extending handle fixed to said sleeve, the connection between said tube and said one wedge being effected by interfitting means for preventing relative rotation therebetween and for maintaining said handle in radial alignment with the slot in the sleeve, whereby said sleeve readily may be oriented within a pipe to be stopped.

5. A pipe stopper comprising: a cylindrical sleeve adapted to be inserted through a circular transverse cut-out portion of a pipe line, said sleeve having a slot extending the entire length thereof; a plurality of radial vanes secured to the interior of said sleeve and extending inwardly thereof, the end portions of said vanes being oppositely tapered; an oppositely threaded jackscrew; a pair of oppositely disposed conical wedging elements threadedly carried by said screw for opposite axial movement and for mutual wedging engagement with said tapered end portions of said vanes; means on said elements engaging at least one of said vanes for preventing relative rotation between said sleeve and said elements to thereby expand said sleeve by rotation of said screw in one direction; means defining an annular groove on said screw between said wedging elements; and projections on said vanes extending into said groove for limiting relative axial movement between said screw and said vanes.

6. The structure defined in claim 5 in which the vane projections are of slightly less width than said groove to permit of slight relative axial movement between said screw and said sleeve in order to effect unequal expansion of said sleeve axially therealong.

7. A pipe stopper comprising: a cylindrical sleeve adapted to be inserted through a circular transverse cut-out portion of a pipe line, said sleeve having a slot extending the entire length thereof; a plurality of radial vanes secured to the interior of said sleeve and extending inwardly thereof, the end portions of said vanes being oppositely tapered; an oppositely threaded jackscrew; a pair of oppositely disposed conical wedging elements threadedly carried by said screw for opposite axial movement and for mutual wedging engagement with said tapered end portions of said vanes; means on said elements engaging at least one of said vanes for preventing relative rotation between said sleeve and said elements to thereby expand said sleeve by rotation of said screw in one direction; a concentric collar on the outer end of one of said wedging elements; an operating tube detachably coupled to said collar and adapted to sealingly extend through the closed end of a stopper bell to effect axial movement of the stopper into and out of the cut-out portion of the pipe line; means defining interengaged radially disposed surfaces on said collar and tube to prevent relative rotation therebetween; laterally extending handle means on said tube having a fixed angular relation with said interengaged radial surfaces and disposed in radial alignment with said sleeve slot in order to orient the latter within the pipe line; and an operating extension of said screw extending through said tube in sealing relation thereto and projecting out of the free end thereof.

8. The structure defined in claim 7 in which the screw has a reduced portion adjacent the collar; and the screw extension comprises a socketed rod receiving said reduced portion and pinned thereto.

JOHN J. SMITH.

References Cited in the file of this patent

UNITED STATES PATENTS

| Number | Name | Date |
|---|---|---|
| 880,674 | Ladd | Mar. 3, 1908 |
| 2,192,331 | Schaefer | Mar. 5, 1940 |
| 2,237,476 | Cline | Apr. 8, 1941 |
| 2,425,483 | Mueller | Aug. 12, 1947 |